United States Patent

Benson

[11] Patent Number: 5,098,232
[45] Date of Patent: Mar. 24, 1992

[54] THREAD CUTTING TOOL

[75] Inventor: Richard Benson, Bradford-on-Avon, England

[73] Assignee: Stellram Limited, Wiltshire, England

[21] Appl. No.: 128,337

[22] Filed: Dec. 2, 1987

Related U.S. Application Data

[63] Continuation-in-part of Ser. No. 084,169, Mar. 31, 1987, abandoned, which is a continuation-in-part of Ser. No. 661,176, Oct. 15, 1984, abandoned.

[30] Foreign Application Priority Data

Oct. 24, 1983 [GB] United Kingdom ............... 8327581

[51] Int. Cl.⁵ .................... B23G 5/18; B23D 77/02
[52] U.S. Cl. ................................ 407/33; 407/24; 407/48
[58] Field of Search .......... 409/66, 74, 76, 65, 409/67, 68, 69, 70, 71, 72, 73, 78; 408/222; 407/25, 24, 113, 70, 33, 48, 52, 63, 35, 64, 99; 10/141 R, 101 R, 111, 101 P, 102

[56] References Cited

U.S. PATENT DOCUMENTS

| | | | |
|---|---|---|---|
| 1,202,195 | 10/1916 | Lees | 407/24 |
| 1,586,186 | 5/1926 | Erdman | 407/24 |
| 1,740,604 | 12/1929 | Kienl | 407/64 |
| 1,874,536 | 8/1932 | Irwin | 407/24 X |
| 2,025,558 | 12/1935 | Thomas et al. | 409/66 |
| 2,173,401 | 9/1939 | Stone | 407/24 |
| 2,360,003 | 10/1944 | McDonald | 407/24 |
| 2,454,087 | 11/1948 | Ransome | 409/66 |
| 2,693,020 | 11/1954 | Pelphrey | 407/25 |
| 3,566,496 | 3/1971 | Kezirian | 10/102 |
| 3,829,921 | 8/1974 | Delaney | 10/141 R |

FOREIGN PATENT DOCUMENTS

| | | | |
|---|---|---|---|
| 62621 | 10/1982 | European Pat. Off. | 407/113 |
| 1223230 | 8/1966 | Fed. Rep. of Germany | 10/101 |
| 486867 | 10/1975 | U.S.S.R. | 409/74 |
| 255935 | 7/1926 | United Kingdom | 409/76 |
| 1567004 | 5/1980 | United Kingdom | 407/113 |

Primary Examiner—William Briggs
Attorney, Agent, or Firm—Wenderoth, Lind & Ponack

[57] ABSTRACT

A thread-cutting tool comprises a shank 10 for attachment to the spindle of a milling machine, the forward end portion of which shank is formed with a flat 12 recessed to provide a pocket for a flat cutting insert 11. The insert, which is triangular in this instance, has one edge formed with a line of threadform teeth of identical profile. The teeth project laterally for cutting engagement with a work-piece. The surface of the work-piece which is to be formed with a thread is mounted on a fixed work-table of the machine. The tool is rotated about the spindle axis and is simultaneously moved by the spindle in a path centered on the axis of the surface of the work-piece to bring the teeth of the insert into engagement with the surface and the spindle and tool are moved axially continuously by a distance equal to one thread pitch for each revolution of the tool in the circular path, so in one revolution of the tool in the path a number of complete turns of the screw-thread are formed equal to the number of teeth of the insert in engagement with the work-piece.

6 Claims, 4 Drawing Sheets

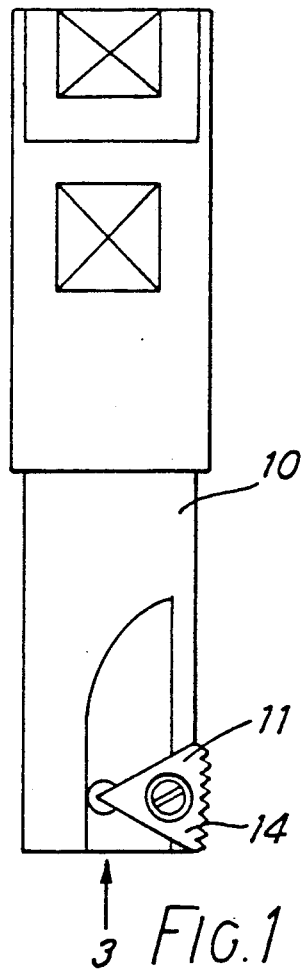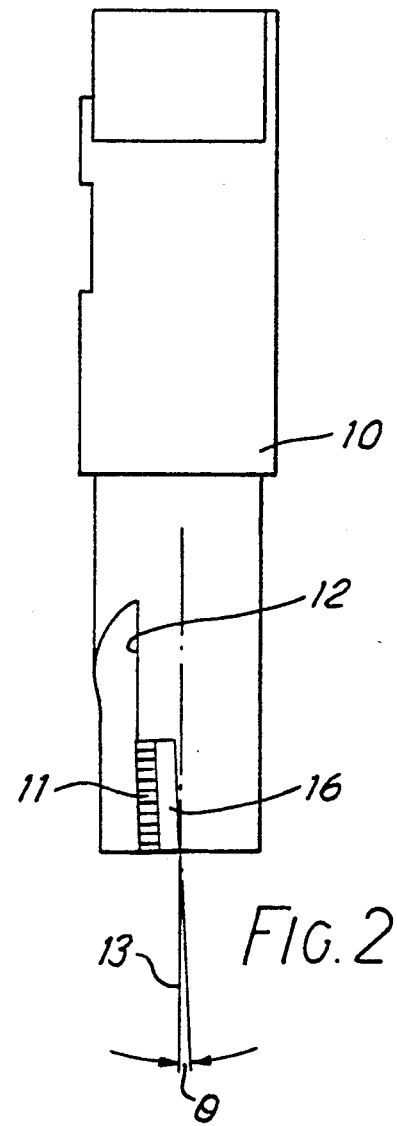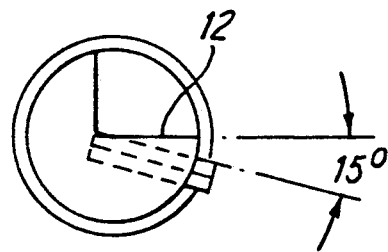

THREAD CUTTING TOOL

This application is a continuation-in-part of my Application Ser. No. 84,169, filed on Mar. 31, 1987 now abandoned, which was in turn a continuation-in-part of my Application Ser. No. 661176, filed on Oct. 15, 1984, now abandoned.

BACKGROUND OF THE INVENTION

1. Field of the Invention

This invention concerns the cutting of screw-threads and more particularly relates to a thread-cutting tool and methods of cutting threads on both cylindrical and tapering surfaces.

2. Description of the prior art

The cutting of screw-threads in cylindrical surfaces presents problems, more particularly where the surface is of large diameter The conventional method of cutting such threads is to rotate the work-piece and the thread-cutting tool relative to one another about the axis of the surface and to feed the cutting tool axially along the surface. The teeth of the cutter are graded in size and shape along the length of the cutter so that the leading tooth takes a small cut off the metal and each succeeding tooth in the line cuts off a little more metal than the preceding tooth. In this way each turn of the screw-thread is formed gradually. In most cases, and for various reasons, a single cutter cannot be made long enough to bring the teeth of the screw-thread to their final profile, and it is usual to have a set of three or more taps or dies which are used in succession, so that the profile of the screw-thread is not complete until the final cutting tooth of the final tap or die of the set has passed along the full length of the screw-thread being cut. Where the screw-thread is to be formed on a large-diameter surface, the cost of a set of taps or dies is formidable and where a non-standard thread profile would be ideal may be prohibitive. To some extent the problem can be alleviated by forming the cutting teeth on an insert which is removably mounted on a carrier and which can readily be replaced when it becomes worn, but the teeth of the insert are absolutely essentially of the same form as those of a tap or die, that is to say that the shape of the teeth in the line is graded in size and shape, each tooth cutting a little more metal off than the preceding tooth, so that only when the thread has been traversed by the final tooth of the final insert of a set does the thread achieve its final profile. Thus whether an insert or a tap or die is used in this method, the teeth must be carefully graduated in size and shape and individually profiled to bring the screw-thread profile to its correct shape.

SUMMARY OF THE INVENTION

The present invention provides in its broadest aspect a thread cutting tool with a cutting insert formed with a line of teeth which are identical to each other and which have a profile complementary to that of the finished tooth of the screw-thread. In use of this thread-cutting tool, the tool is mounted on the spindle of a milling machine for rotation about the axis of the spindle and the spindle is simultaneously moved in a path centered on the axis of the surface of the work-piece which is to be screw-threaded. The work-piece is mounted on a stationary work table. The said path is of a radius such that the rotating tool cuts into the said surface of the work-piece to the full depth of the cutting teeth. At the commencement of the cutting operation, the line of teeth of the cutting tool insert overlaps the leading end of the said surface of the work-piece by its full length less approximately one tooth, and initially, with the tool rotating about its own axis, the circular movement is commenced and the radius of said path is adjusted to bring the teeth of the cutter into cutting engagement with the cylindrical surface to their full cutting depth. Simultaneously, the tool is moved axially by the pitch distance of the thread progressively as the tool is moved through one full circuit of its circular path. Thus, at the end of that circuit, the tool will have cut a number of turns of the thread equal to the number of teeth on the insert. If more turns of the thread are required, the cutting tool is re-positioned axially with its trailing tooth positioned for engagement in the final turn of the part of the thread already cut. Then with the cutting tool rotating, the radius of said path is adjusted to bring the cylindrical surface into full cutting engagement with the tool, and another set of complete turns of the screw-thread is cut as the tool is moved through another single circuit of said path. The process is repeated until the required number of turns of the thread have been cut. Thus, if the insert has five complete teeth, slightly less than five complete turns of the screw-thread would be cut in the first single circuit of the movement of the cylindrical circuit and four further turns would be cut in each succeeding circuit. The line of the insert is disposed parallel to the work-piece surface in which the thread is to be cut, so that where the surface is cylindrical the line of teeth extends parallel to the axis of the shank of the tool, and where the surface is conically inclined the line of teeth is similarly inclined to the axis of the shank of the tool. Where the surface is cylindrical, the radius of said path is constant but where the surface is conically inclined the radius of said path is varied continuously to follow the profile of the surface.

The shaping of the teeth of the insert so that all the teeth are of identical profile and are of complementary form to the tooth shape to be cut allows huge savings in costs of the cutting tool to be made and allows any required tooth profile to be formed.

In one aspect the invention provides a thread-cutting tool comprising an elongate shank having a lengthwise axis; a pocket formed in said shank, said pocket having a flat bottom; and a cutting insert which is a flat or substantially flat plate removably secured against said flat bottom of said pocket, said cutting insert having a cutting edge projecting laterally of said shank, said cutting edge being formed with a line of thread-form teeth which line is parallel to the axis of the shank, and said teeth being of identical profile.

In another aspect the invention provides a method of cutting an internal or external screw-thread on a cylindrical surface of a work-piece by means of a thread-cutting tool as set forth in the preceding paragraph whereof said line of teeth extends parallel to the lengthwise axis of the shank and to said cylindrical surface, comprising the steps of rotating said thread-cutting tool about said lengthwise axis, moving said tool in a path centered on the axis of said cylindrical surface, which path is of such radius as to bring the teeth of the insert into cutting engagement with said cylindrical surface and, simultaneously with said rotation of said tool about the axis of said workpiece, moving said tool relative to said work-piece axially a distance equal to the axial pitch of said screw-thread for each revolution of said tool in said path.

The invention further provides a method of cutting an internal or external screw-thread on a conically inclined surface of a work-piece by means of a thread-cutting tool comprising an elongate shank having a lengthwise axis, a pocket having a flat bottom formed in said shank, and a cutting insert which is a flat or substantially flat plate which is removably secured against said flat bottom of said pocket, said cutting insert having a cutting edge projecting laterally of said shank, said cutting edge being formed with a line of thread-form teeth inclined relative to said lengthwise axis, and which line is said teeth being of identical profile, said inclined line of teeth being parallel to said conically inclined surface of said work-piece, which method comprises rotating said thread-cutting tool about said lengthwise axis and moving said tool in a path centered on the axis of said conically inclined surface which axis is parallel to said lengthwise axis of said shank to bring said teeth of said tool into cutting engagement with said conically inclined surface and, simultaneously with said rotation of said tool about said axis of the conically inclined surface, moving said tool axially relative to the workpiece a distance axis to the axial pitch of said screw-thread for each revolution of said work-piece in said path, the radius of said path being varied continuously in dependence on the instantaneous relative axial positions of said tool and said conically inclined surface of said work-piece to cut the thread.

The teeth of the insert may be cut at an angle with respect to the two principal faces of the insert, said angle corresponding to the helix angle of the thread which is to be cut but it is preferred that the teeth be straight cut (i.e. at right angles to said principal faces). In the latter case in particular the base of the pocket may be parallel to the lengthwise axis of the shank, or may be angled at a small angle (say 1° or 1½°) to the said axis of the shank to incline the teeth at such an angle. Additionally, or alternatively, an anvil plate may be disposed between the insert and the base of the pocket and may have its principal faces inclined to each other at the angle required to provide the appropriate helix angle.

In one preferred construction the insert is of flat triangular form. A set of teeth may be formed along more than one edge of the insert.

The insert may be secured in said pocket by a screw extending through a hole in the insert and into a threaded hole in the bottom of said pocket.

If desired, the shank may have one or more further pockets each capable of accommodating an insert identical to the first said insert.

BRIEF DESCRIPTION OF THE DRAWINGS

One embodiment of the invention will now be described by way of example with reference to the accompanying drawings in which:

FIGS. 1 and 2 are respectively front and side elevations of a thread-cutting tool according to the invention, FIG. 3 is an end view in the direction of the arrow 3 in FIG. 1, FIGS. 4 and 5 illustrate the method according to the invention of using the tool of FIGS. 1 to 3 to cut internal and external threads respectively on a workpiece, and FIG. 6 further illustrates the method of the invention,

DETAILED DESCRIPTION OF THE PREFERRED EMBODIMENT

Figure 4:
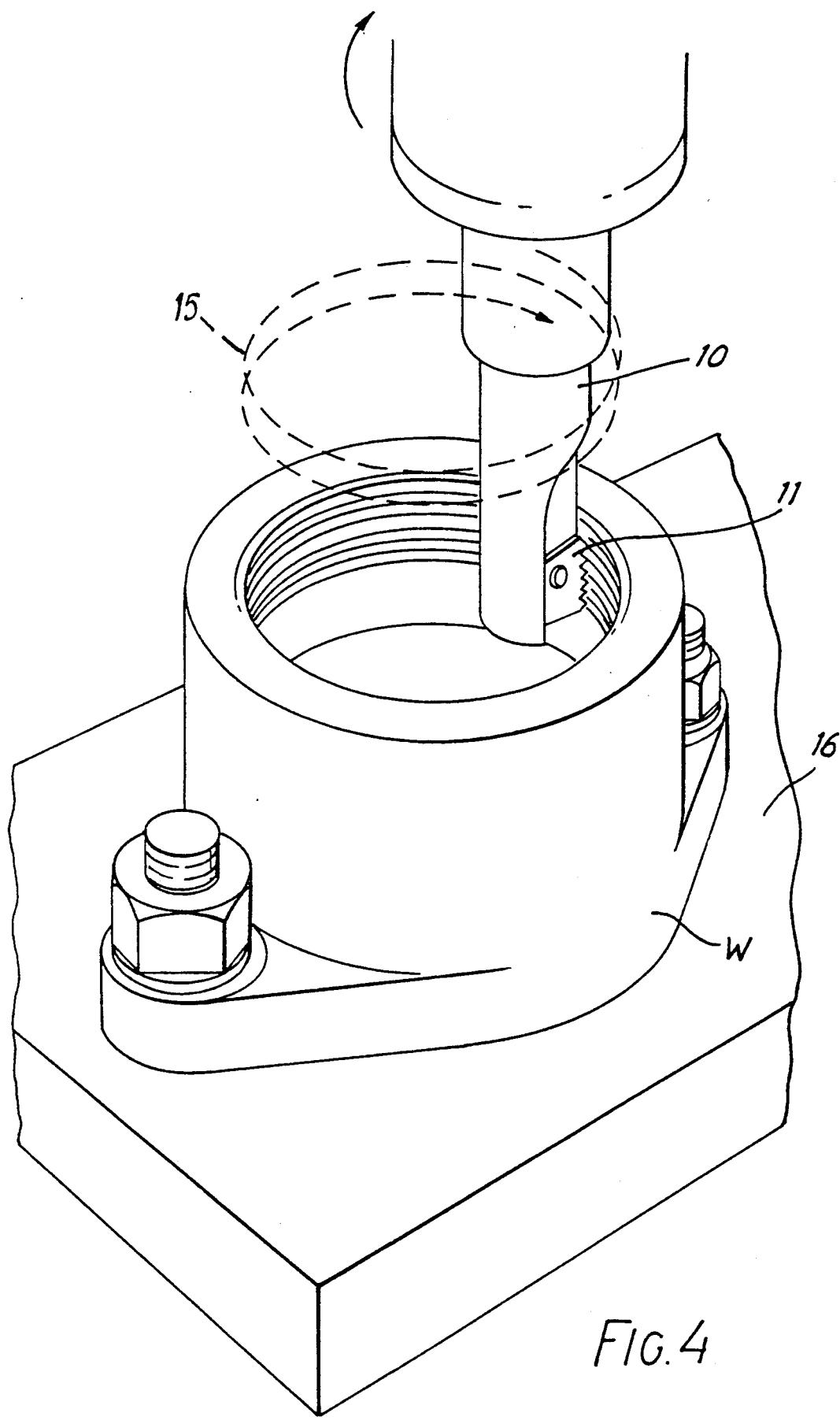

Referring to FIGS. 1 to 3, the tool comprises an elongate shank 10 and a triangular cutting insert 11 secured at the leading end portion of the shank. The root portions of the shank are shaped according to any suitable one of the standards used in tools for milling machines. The leading end portion of the shank has a flat 12 cut on it and a flat-bottomed, substantially triangular pocket is cut in the flat and receives the insert 11. The flat bottom of the pocket is inclined at a small angle $\theta$ corresponding to the helix angle of the required thread, so that viewed from the side the bottom of the recess is skewed relative to the lengthwise axis 13 of the shank. 1¼° and 1° have been found to be suitable values for $\theta$, being a close approximation to the correct helix angle for a wide range of thread diameters, but in some cases $\theta$ may be 0°, i.e. the bottom of the pocket is parallel to the axis 13. The insert is secured by a screw 14 extending through an aperture in the insert, and through an aperture in a triangular anvil plate 16 which in this arrangement is also disposed in the pocket, into a threaded hole in the bottom of the pocket. The anvil plate may be omitted.

In the tool shown in FIGS. 1 to 3, the anvil has parallel faces, but the pocket may alternatively have its base parallel to the axis of the shank and either the anvil may have its principal faces inclined to each other at the required angle or the teeth of the insert may be cut at a small angle instead of being straight cut. It will be clear that combinations of these methods are also possible to achieve a required angular positioning of the teeth of the insert.

The insert itself is of flat plate form and in this example is of triangular outline, the teeth being complementary in profile to the teeth to be cut and being straight cut or tapered at a suitable angle to cut a taper thread and extending through the thickness of the plate material. Any convenient manner of securing the insert in the pocket may be employed. Teeth may be formed along one or more of the edges of the insert to allow indexing of the insert when a set of teeth becomes worn. The insert and pocket can be of any desired matching shape. The insert can be made in any variety of hard materials such as high speed steel, carbon steel, ceramics, carbide, coated carbide, titanium and silicon based materials.

Figure 5:
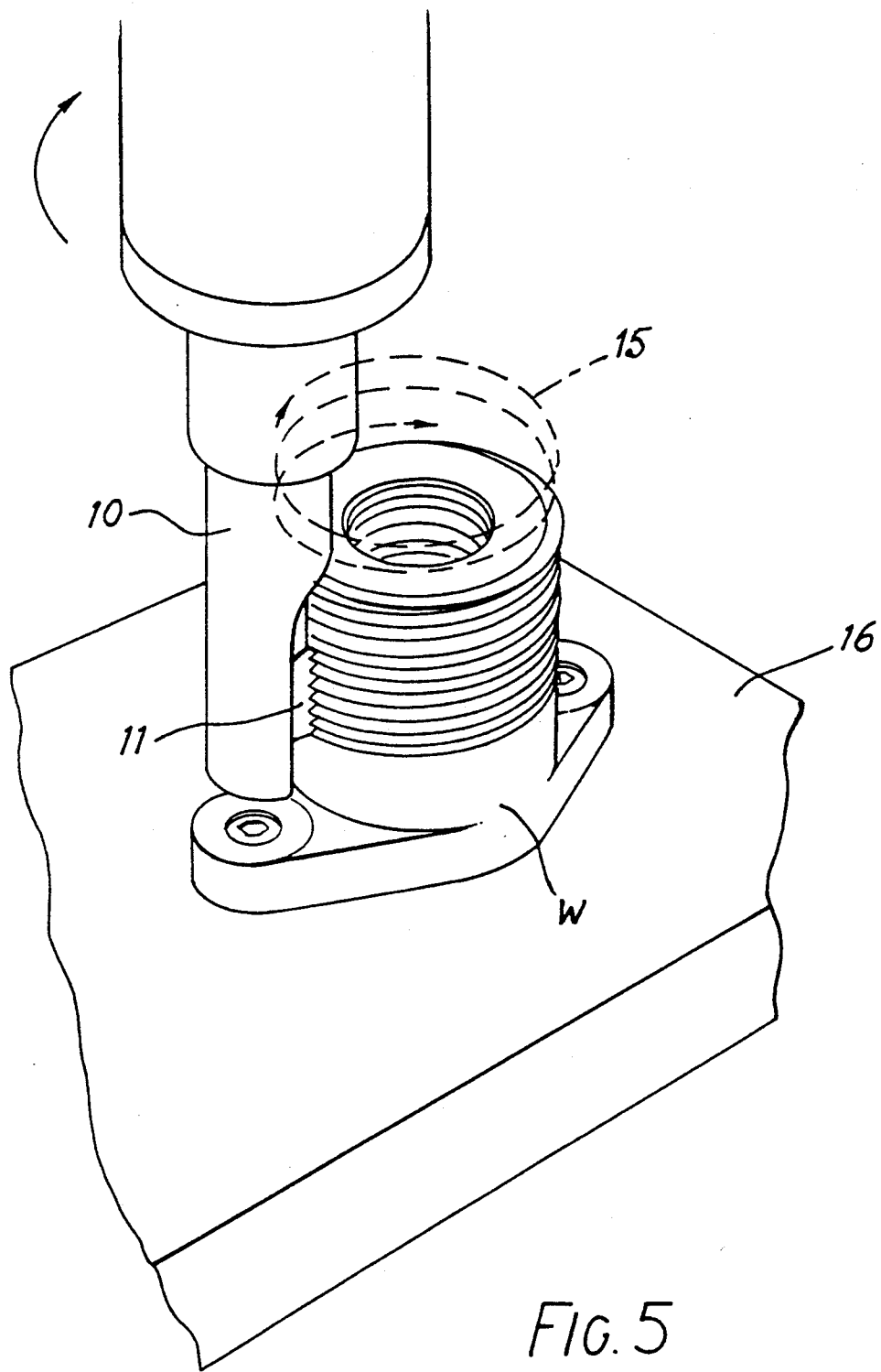

In use, the shank of the tool is mounted on and coaxially with the spindle of a milling machine, and the work-piece W is mounted on the work-table 16 of the machine as shown in FIGS. 4 and 5, and the tool is rotated about the fixed axis of the spindle. The milling machine is a numerically-controlled machine such that its spindle can be moved precisely in any desired continuous path in the X, Y and Z planes. The tool, rotating rapidly about the axis of the spindle, is initially moved radially to bring its teeth into full thread-depth cutting engagement with the surface to be screw-threaded. The spindle and tool are then caused to move in a path centered on the axis of the surface which is to be screw-threaded, which axis is parallel to the axis of the spindle, the radius of said path being such that the teeth of the cutting tool are maintained in cutting engagement with the work-piece surface to the full depth of the teeth Concurrently with this movement of the cutting tool, the spindle and tool are moved axially by a distance equal to the desired pitch of the screw-thread in the time taken for the tool to move through one circuit of the path 15, i.e. through one revolution about the central axis of the surface which is being screw-threaded. In one complete circuit of the path 15 by the tool the entire peripheral length of the cylindrical surface to be screwthreaded is engaged by the tool. Each tooth of the insert in engagement with the work-piece surface thus leaves behind it a fully and correctly shaped groove and in one circuit of the path 15 by the tool forms one complete turn of the required screw-thread. If the required number of turns exceeds the number of teeth on the insert, the machine is stopped after one turn of the path 15 is completed, the teeth are withdrawn radially from engagement with the surface to be screw-threaded and the tool is advanced until the trailing end tooth in the line is axially positioned for engagement in the leading turn of the thread already cut, and another circuit of the work-piece along the path 15, with an initial radial movement to cutting depth, is then commenced as just described. The rotational speed of the spindle is of course much higher than that of the circular movement of the work-table.

Figure 6:
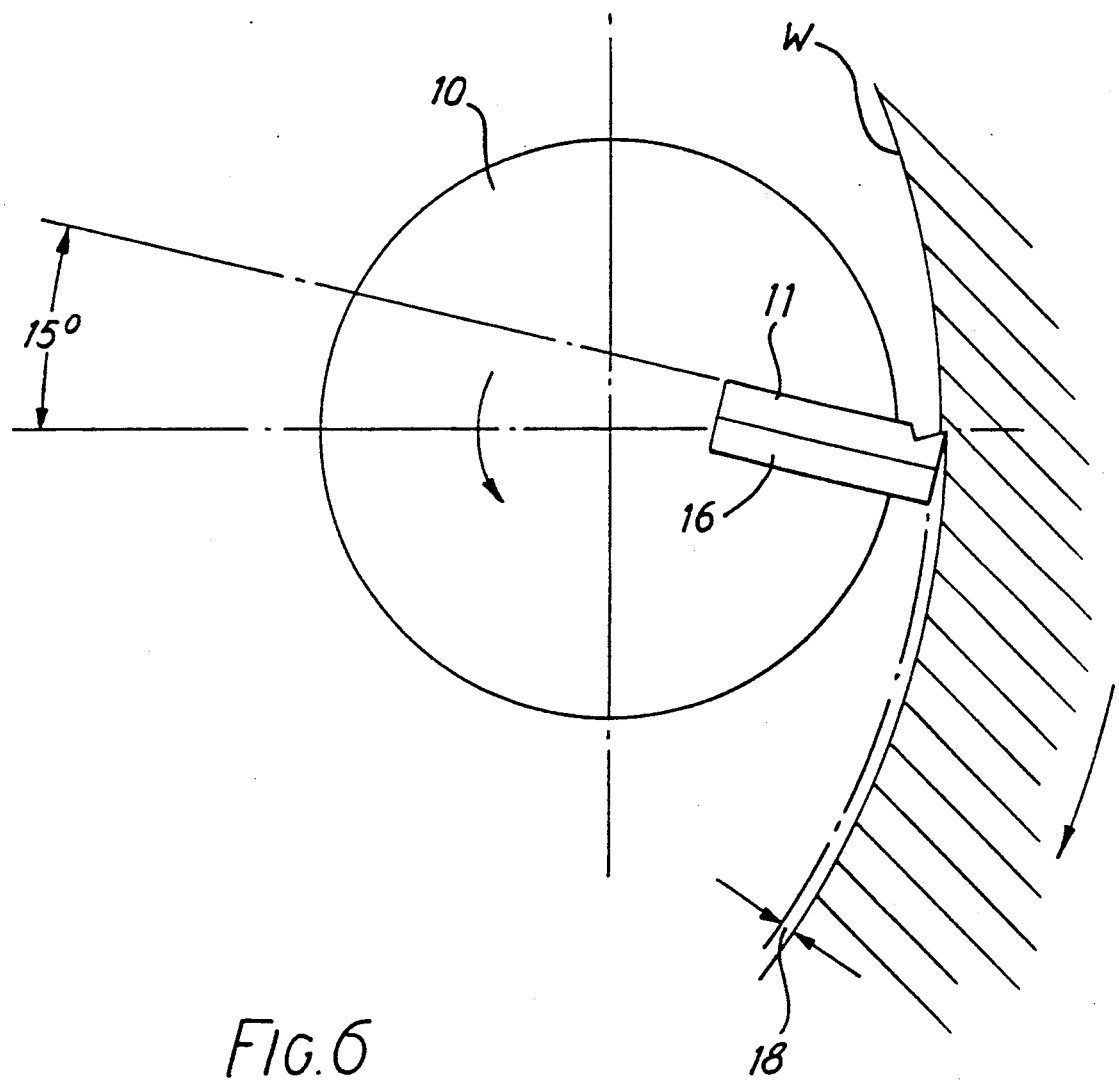

In order to avoid interference, particularly where an internal thread is being cut, and to provide an appropriate positive cutting angle the base of the recess is in this instance inclined at 15° relative to a common plane containing the spindle axis and the axis of said circular path as shown in FIG. 6, the clearance being indicated at 18. The effect of this angle may be modified by grinding a desired rake angle on the cutting edge of the teeth.

Where the work-piece is to have a tapering thread applied to it, the line of cutting teeth will be inclined with respect to the lengthwise axis of the shank at an angle equal to the angle of the conically inclined surface of the workpiece to which the thread is to be applied, so that the line of teeth of the tool is parallel to said inclined surface, and a numerically-controlled milling machine is employed and is programmed to move the tool in a circle of continuously increasing or decreasing radius according to the direction of axial feed of the tool, as the tool and machine spindle are moved axially.

It will be understood that the relative axial movement of the tool and workpiece may be carried out by moving the work-table carrying the work-piece axially simultaneously with and in direct relationship with the movement of the tool in a circular path. It is further possible to superimpose on these movements of the workpiece a higher speed rotation about the lengthwise axis of the shank of the cutting tool, so that the cutting tool remains stationary and all the required movements are carried out by the workpiece. However, it is generally more economical to carry out the method in the way described above and illustrated.

While the invention has been described with reference to the foregoing embodiments, many changes and modifications may be made thereto which fall within the scope of the appended claims.

I claim:

1. A thread-milling tool comprising an elongate rotary shank having a lengthwise axis, a flat cut in one end of the shank, a pocket formed in said flat cut, said pocket having a flat bottom, a single cutting insert which is of flat or substantially flat plate form; and means for removably clamping a principal surface thereof against said flat bottom of said pocket, said cutting insert having a cutting edge projecting laterally of said shank, said cutting edge being formed with a plurality of thread-form teeth arranged in a straight line which line, when viewed at right angles to said principal surface, extends parallel to said lengthwise axis, and said teeth being of identical profile.

2. A thread-milling tool comprising an elongate rotary shank having a lengthwise axis; a pocket formed in said shank, said pocket having a flat bottom; a cutting insert which is of flat or substantially flat plate form; and means for removably securing a principal surface thereof against said flat bottom of said pocket, said cutting insert having a plurality of cutting edges one of which projects laterally of said shank, each of said cutting edges being formed with a plurality of thread-form teeth arranged in a straight line, the line of teeth on said one edge extending parallel to said lengthwise axis, and said teeth being of identical profile.

3. A thread-milling tool comprising an elongate rotary shank having a lengthwise axis; a V-shaped pocket formed in said shank, said pocket having a flat bottom; a cutting insert which is of flat or substantially flat triangular plate form and having a principal surface thereof disposed against said flat bottom of said pocket, said insert having a central aperture, a screw extending through said central aperture and into the flat bottom of the pocket to removably secure the insert, said cutting insert having one edge thereof projecting laterally of said shank, said one edge being formed with a plurality of thread-form teeth arranged in a straight line which line extends parallel to said lengthwise axis, and said teeth being of identical profile.

4. A thread milling tool comprising ann elongate rotary shank having a lengthwise axis; a pocket formed in said shank, said pocket having a flat bottom; a single cutting insert which is of a triangular flat or substantially flat plate form; and means for removably clamping a principal surface of said cutting insert against said flat bottom of said pocket, said cutting insert having a cutting edge projecting laterally of said shank, said cutting edge being formed with a plurality of thread-form teeth arranged in a straight line which extends parallel to said lengthwise axis, and said teeth being of identical profile.

5. A thread milling tool comprising an elongate rotary shank having a lengthwise axis; a pocket formed in said shank, said pocket having a flat bottom; a single cutting insert which is of a flat or substantially flat plate form; and means for removably clamping a principal surface of said cutting insert against said flat bottom of said pocket, said cutting insert having a cutting edge projecting laterally of said shank, said cutting edge being formed with a plurality of thread-form teeth arranged in a straight line which extends parallel to said lengthwise axis, and said teeth being of identical profile and being inclined at a small angle to a normal too the principal faces of said insert.

6. A tool as claimed in claim 3 further comprising an anvil plate disposed between the insert and the bottom of the pocket, the insert being clamped to the bottom of the pocket through the anvil.

* * * * *